US009182038B2

(12) United States Patent
Hayakawa et al.

(10) Patent No.: US 9,182,038 B2
(45) Date of Patent: Nov. 10, 2015

(54) COOKER WITH STEAM GENERATING FUNCTION

(75) Inventors: Yuji Hayakawa, Shiga (JP); Yoshio Nakajima, Shiga (JP); Akimi Nishi, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 425 days.

(21) Appl. No.: 13/520,760

(22) PCT Filed: Jan. 5, 2011

(86) PCT No.: PCT/JP2011/000012
§ 371 (c)(1),
(2), (4) Date: Jul. 5, 2012

(87) PCT Pub. No.: WO2011/083757
PCT Pub. Date: Jul. 14, 2011

(65) Prior Publication Data
US 2012/0279400 A1   Nov. 8, 2012

(30) Foreign Application Priority Data
Jan. 7, 2010   (JP) .................... 2010-001685

(51) Int. Cl.
*A47J 27/00*   (2006.01)
*F16J 15/04*   (2006.01)
(Continued)

(52) U.S. Cl.
CPC .............. *F16J 15/04* (2013.01); *A23L 1/0121* (2013.01); *A47J 36/2483* (2013.01); *F24C 15/003* (2013.01); *F24C 15/327* (2013.01); *A47J 2027/043* (2013.01)

(58) Field of Classification Search
CPC ............ A47J 36/2483; A47J 2027/043; A23L 1/0121
USPC ............ 99/473, 474, 476; 219/401, 682, 688; 126/369; 285/331
See application file for complete search history.

(56) References Cited

U.S. PATENT DOCUMENTS 3,994,515 A * 11/1976 Cotten ...................... 285/21.2
7,045,745 B2 * 5/2006 Kim .......................... 219/400
(Continued)

FOREIGN PATENT DOCUMENTS

CN       1868775 A    11/2006
CN       1981160 A     6/2007
(Continued)

OTHER PUBLICATIONS

International Search Report for International Application No. PCT/JP2011/000012, dated Mar. 22, 2011, 1 page.
(Continued)

Primary Examiner — Reginald L Alexander
(74) Attorney, Agent, or Firm — Brinks Gilson & Lione

(57) ABSTRACT

Provided is a cooker with a steam generating function without leakage of water and having excellent reliability and durability. A connecting member is formed of a soft material, and is guided by a convex-shaped guide portion having a rounded tip when it is inserted into an opening concave portion of a water tank (FIG. 4), and a convex-shaped seal portion for ensuring a seal can uniformly contact the opening concave portion. Moreover, the convex-shaped seal portion for ensuring the seal is integrally formed with a connection portion 3. Therefore, the durability and the reliability for slipping-off prevention can be enhanced, and the number of components can also be reduced.

3 Claims, 7 Drawing Sheets

(51) Int. Cl.
*A47J 36/24* (2006.01)
*A23L 1/01* (2006.01)
*F24C 15/32* (2006.01)
*F24C 15/00* (2006.01)
*A47J 27/04* (2006.01)

(56) References Cited

U.S. PATENT DOCUMENTS

| | | | |
|---|---|---|---|
| 7,404,581 B2* | 7/2008 | Baving et al. | 285/242 |
| 2002/0003342 A1 | 1/2002 | Slatten | |
| 2005/0035597 A1* | 2/2005 | Bamberger et al. | 285/340 |
| 2005/0127061 A1* | 6/2005 | Ha | 219/401 |
| 2005/0184515 A1 | 8/2005 | Isayama et al. | |
| 2007/0215595 A1* | 9/2007 | Wang | 219/401 |
| 2008/0073338 A1 | 3/2008 | Inada et al. | |
| 2008/0075823 A1 | 3/2008 | Jeon et al. | |
| 2009/0001716 A1 | 1/2009 | Ehrmann | |
| 2010/0206414 A1 | 8/2010 | Adamczak et al. | |

FOREIGN PATENT DOCUMENTS

| | | |
|---|---|---|
| CN | 101334117 A | 12/2008 |
| DE | 10 2005 051 598 A1 | 5/2007 |
| DE | 10 2007 048 200 A1 | 4/2009 |
| EP | 1 360 926 A1 | 11/2003 |
| EP | 1 906 099 A2 | 4/2008 |
| JP | 10-267181 A | 10/1998 |
| JP | 2005-220978 A | 8/2005 |
| JP | 2006-017398 A | 1/2006 |
| KR | 10-2006-0082472 A | 7/2006 |
| KR | 10-0610669 B1 | 8/2006 |

OTHER PUBLICATIONS

Extended European Search Report in corresponding European Application No. 11731755.2, dated Nov. 21, 2014, 9 pages.

* cited by examiner (a)

(b)

(a)

(b) WATER (a)

(b)

(a)

(b)

COOKER WITH STEAM GENERATING FUNCTION

This application is a 371 application of PCT/JP2011/000012 having an international filing date of Jan. 5, 2011, which claims priority to JP 2010-001685 filed Jan. 7, 2010, the entire contents of which are incorporated herein by reference.

TECHNICAL FIELD

The present invention relates to a cooker with a steam generating function which supplies heat and steam into a heating chamber and thus heat treats an object to be heated.

BACKGROUND ART

As a conventional cooker, there is known a cooker with a steam generating function which generates steam in cooking (for example, see Patent Document 1).

FIG. 2 is a perspective view showing a cooker 5 with a steam generating function which serves as a cooker. FIG. 3 is a perspective view showing the cooker 5 with the steam generating function which includes a water tank housing member in a lower part of a front surface. As shown in FIGS. 2 and 3, the cooker 5 with the steam generating function serving as the cooker includes a water tank 6 configured to store water to generate steam and provided below a heating chamber which is opened on a front surface for accommodating an object to be heated therein.

The water tank 6 is accommodated in a water tank housing portion 7 provided below the heating chamber of the cooker 5 with the steam generating function, and is removably attached from the front surface side of the cooker 5 with the steam generating function. FIG. 4 is a perspective view showing the water tank 6. FIG. 4(a) is a perspective view seen from the front surface of the water tank 6. FIG. 4(b) is a perspective view seen from a rear surface of the water tank 6. As shown in FIG. 4(b), an opening concave portion 8 is provided on the rear surface of the water tank 6 (see FIG. 2), and the water tank 6 and the water tank housing portion 7 are removably connected to each other by means of a connecting member provided in the water tank housing portion 7 (see FIG. 3).

Next, a method for supplying water from the water tank 6 storing water therein to a heating chamber body of the cooker 5 with a steam generating function will be described with reference to FIG. 5. FIG. 5 is a sectional side view showing a state in which the water tank 6 is connected to the connecting member in the water tank housing portion 7. FIG. 5(a) is a sectional side view showing a state in which the water tank 6 is not connected to the connecting member, and FIG. 5(b) is a sectional side view showing a state in which the water tank 6 is connected to the connecting member and a sectional side view showing a path for water. As shown in FIG. 5(a), the water stored in the water tank 6 (not shown) is pushed against the water tank 6 by means of a valve shaft 15 connected to a tank packing 14 and a spring (not shown), thereby sealed so as not to leak out of the water tank 6.

As shown in FIG. 5(b), when the water tank 6 is inserted into the water tank housing portion 7 (see FIG. 3), a connecting member provided in the water tank housing portion 7 is connected to an opening concave portion 8 provided on the rear surface of the water tank 6.

FIG. 7 is a front view and an exploded sectional view showing a conventional connecting member. FIG. 7(a) is a front view showing the conventional connecting member. FIG. 7(b) is an exploded sectional view showing the conventional connecting member. The connecting member is provided with an O-ring packing 12 as shown in FIG. 7(b), and the O-ring packing 12 contacts an internal wall of the opening concave portion 8 so that the water tank 6 and the water tank housing portion 7 are sealed. As shown in FIG. 7(b), the conventional connecting member is formed by a combination of a guide portion 1, the O-ring packing 12 and a water tube 13. Furthermore, the guide portion 1 is formed of a hard material.

When the water tank 6 is further pushed in, the valve shaft 15 is pressed by the connecting member such that a clearance is formed between the tank packing 14 and the water tank 6 as shown in FIG. 7(b). The water stored in the water tank 6 enters from the clearance and passes through an internal hollow portion 4, and is supplied to a water pump (not shown) through the water tube 13 in a water path 16 as shown in an arrow.

When the water tank 6 is removed from the water tank housing portion 7 (FIG. 3) reversely to the procedure, the tank packing 14 is closed so that the water stored in the water tank 6 is sealed in the water tank 6. As a result, the water stored in the water tank 6 can be prevented from leaking out.

With the structure, the water tank 6 is disposed removably from the body of the cooker 5 with the steam generating function which serves as the cooker. Therefore, the water tank 6 can easily be taken out to carry out cleaning or the like. Therefore, usability can be enhanced sanitarily.

RELATED ART DOCUMENTS

Patent Documents

Patent Document 1: JP-A-2006-017398

SUMMARY OF THE INVENTION

Problem to be Solved by the Invention

However, with the conventional structure, the guide portion 1 for guiding an insertion into the opening concave portion 8 of the water tank 6 is formed of the hard material in the connecting member provided in the water tank housing portion 7 for connecting the water tank 6 as described above. For this reason, in the case in which the insertion into the opening concave portion 8 of the water tank 6 is carried out obliquely from a position shifted from a central line of an opening, there is a fear that the O-ring packing 12 provided on the connecting member may contact the opening concave portion 8 unevenly, and sealing may not be carried out perfectly, which results in leakage of the water stored in the water tank 6.

Moreover, the O-ring packing 12 is generally formed of a soft material to have a shape of a thin ring, and is broken due to the repetition of the insertion/removal of the water tank 6. Also in this case, there is a fear that the water stored in the water tank 6 may leak out.

Furthermore, the water tube 13 for supplying the water stored in the water tank 6 to a water pump is connected to the connecting member by press fitting through the internal hollow portion 4 of the connecting member. For this reason, there is also a risk that the water tube 13 slips off if an amount of the press fitting is small.

In order to solve the conventional problems, an object of the invention is to provide a cooker with a steam generating function in which a connecting member for removably connecting a water tank storing water for generating steam is used to eliminate a fear of a leakage of the water stored in the water tank.

Means for Solving the Problem

In order to solve the conventional problems, a cooker with a steam generating function according to the invention includes a connecting member for removably connecting a water tank configured to store water for generating steam formed of a soft material, wherein the connecting member includes a convex-shaped guide having a rounded tip formed over a round in a circumferential direction for guiding when inserted into an opening concave portion disposed in the water tank. Even when the insertion into the opening concave portion of the water tank is carried out obliquely from a position shifted from a central line of an opening of the connecting member, since the connecting member is formed of a soft material and the convex-shaped guide including the rounded tip is provided, the shift of the central line of the opening of the connecting member can be regulated flexibly. Thus, the convex portion of the connecting member uniformly contacts the opening concave portion of the water tank. Consequently, the water stored in the water tank does not leak out.

Advantages of the Invention

The invention can provide a cooker with a steam generating function in which a connecting member for removably connecting a water tank to a cooker body with a steam generating function is formed by a soft material, and a guide portion, a seal portion and a connection portion are constituted integrally with each other so that there is no fear of a leakage of the water and reliability and durability are excellent.

BRIEF DESCRIPTION OF THE DRAWINGS

FIG. 4 is a perspective view showing the water tank, in which FIG. 4(a) is a perspective view seen from a front surface of the water tank and FIG. 4(b) is a perspective view seen from a rear surface of the water tank.

FIG. 5 is a sectional side view showing a state in which the water tank is connected to the connecting member in the water tank housing portion, in which FIG. 5(a) is a sectional side view showing a state in which the water tank is not connected to the connecting member and FIG. 5(b) is a sectional side view showing a state in which the water tank is connected to the connecting member and a sectional side view showing a path for water.

FIG. 6 is an enlarged view showing a main part of a connecting member to be used in a cooker with a steam generating function according to a first or second embodiment of the invention, in which FIG. 6(a) is a front view showing the connecting member according to the present invention and FIG. 6(b) is an exploded sectional view showing the connecting member according to the invention.

FIG. 7 is a front view and an exploded sectional view showing a conventional connecting member, in which FIG. 7(a) is a front view showing the conventional connecting member and FIG. 7(b) is an exploded sectional view.

MODE FOR CARRYING OUT THE INVENTION

Figure 1:
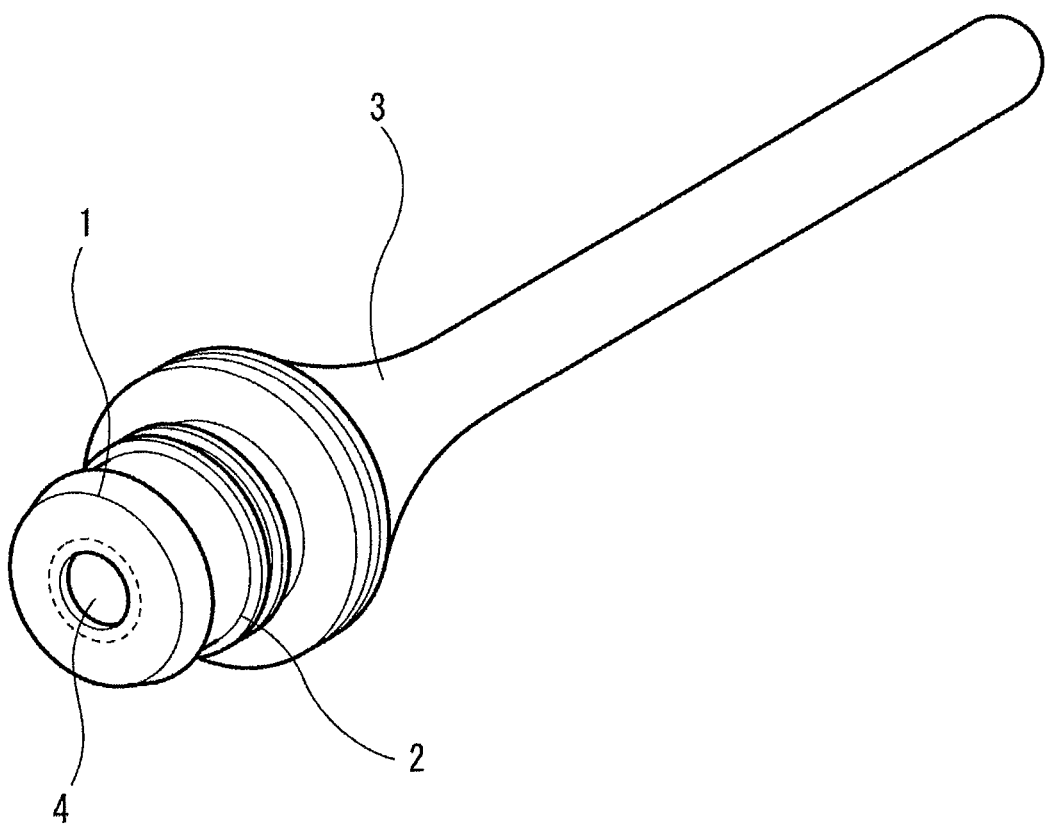
FIG. 1 is a perspective view showing a connecting member to be used in a cooker with a steam generating function according to a first embodiment of the invention.
Figure 2:
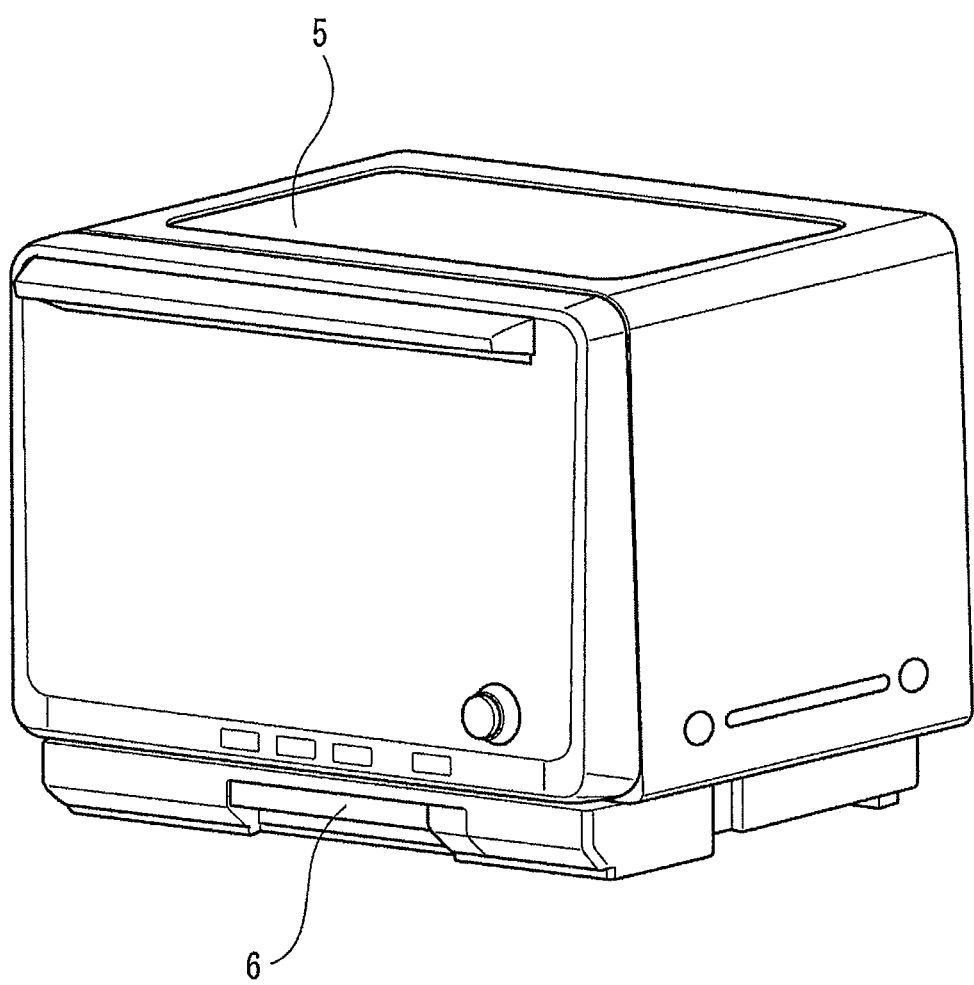
FIG. 2 is a perspective view showing the cooker with a steam generating function which serves as a cooker.
Figure 3:
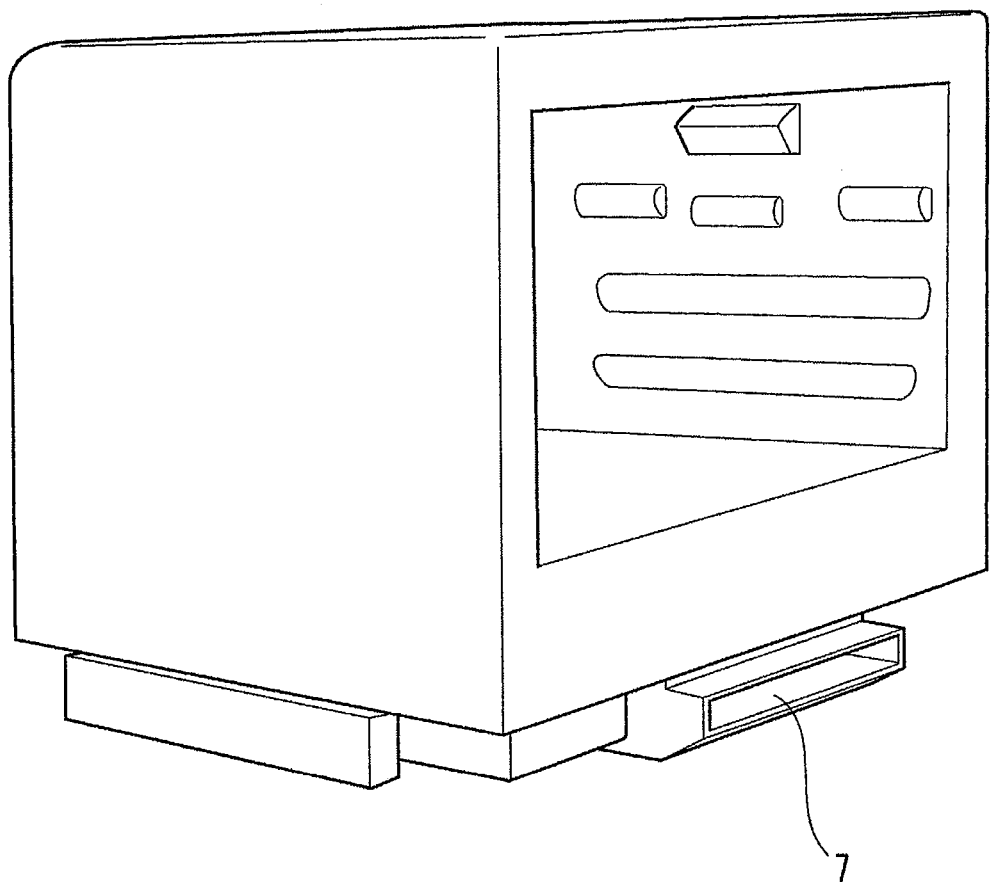
FIG. 3 is a perspective view showing a body having a water tank housing member in a lower part of a front surface.

According to a first invention, a connection member for removably connecting a water tank configured to store water for generating steam is formed of a soft material and includes a convex-shaped guide portion including a rounded tip formed over a round in a circumferential direction for guiding when inserted into an opening concave portion disposed in the water tank. Therefore, even when the insertion into the opening concave portion of the water tank is carried out obliquely from a position shifted from a central line of an opening, since the connection member is formed of a soft material and the convex-shaped guide portion including the rounded tip is provided, the shift of the central line of the opening can be regulated flexibly. Thus, the convex portion of the connecting member uniformly contacts the opening concave portion, whereby the water stored in the water tank does not leak out.

Moreover, the connecting member is coupled to the opening concave portion of the water tank, and a convex seal portion formed over a round in the circumferential direction for ensuring seal with the opening concave portion of the water tank is integrated with a connection portion having a shape of an internal hollow tube. Even when the water tank is repetitively inserted/removed, a stress such as a twist is absorbed by the connecting member as a whole. Therefore, a drawback such as breakage of the seal portion or slipping-off of a water tube is not caused so that durability can be enhanced remarkably.

According to a second invention, in the connecting member, a surface for contacting the opening concave portion of the water tank is blasted so as to have fine concave and convex portions. Therefore, it is possible to relieve a frictional resistance in the removal/insertion of the water tank so that usability can be enhanced.

According to a third invention, in the connecting member, an inside diameter of an internal hollow portion to be inserted into the opening concave portion of the water tank is reduced in a tip inlet part of the connecting member and is increased in a deep part of the connecting member. Consequently, it is possible to prevent the water collected in the internal hollow portion from dropping onto a floor or the like when removing the water tank due to a water exchange or the like.

According to a fourth invention, in the connecting member, a diameter (a radius or a diameter) of the convex-shaped guide portion obtained by rounding the tip of the connecting member is set to be smaller than a diameter (a radius or a diameter) of the convex shape of the seal portion. In the removal/insertion of the water tank, consequently, the convex portion formed over a round in a circumferential direction of the seal portion always forms a certain clearance in contact with the opening concave portion of the water tank. Thus, reliability and durability can be enhanced.

Embodiments according to the invention will be described below with reference to the drawings. The invention is not restricted to the embodiments.

First Embodiment

Figure 4:
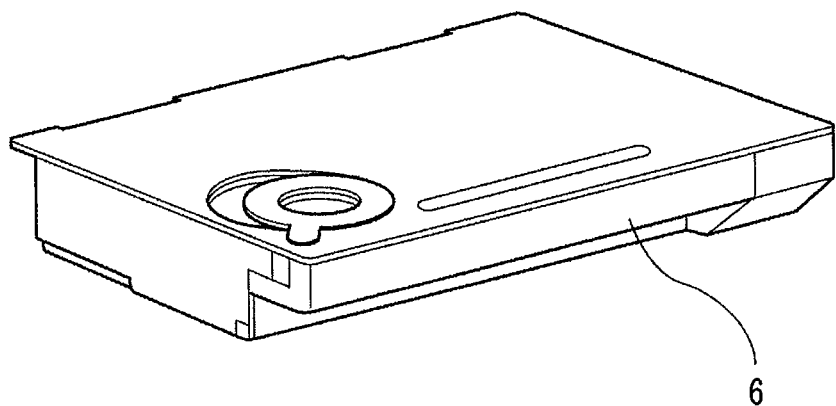
Figure 4:
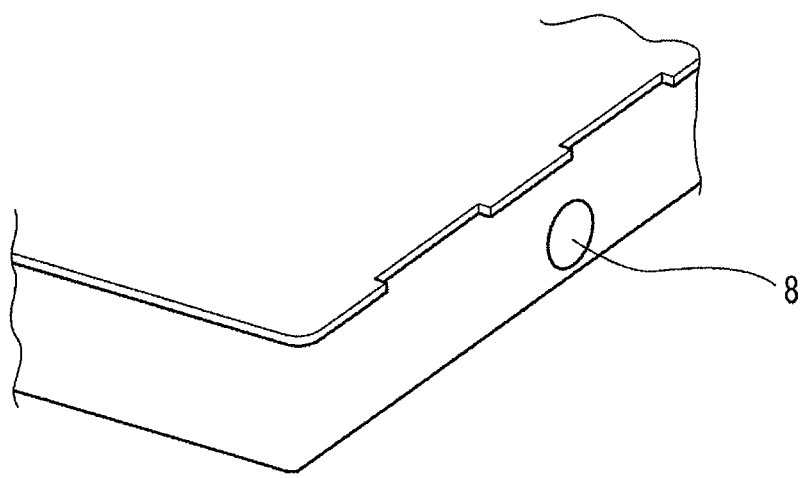

FIG. 1 is a perspective view showing a connecting member to be used in a cooker with a steam generating function according to a first embodiment of the invention. In FIG. 1, the connecting member is formed by a soft material, and a convex-shaped guide portion 1 including a rounded tip formed over a round in a circumferential direction, a convex-shaped seal portion 2 formed over a round in a circumferential direction to ensure a seal with an opening concave portion 8 of a water tank 6 (see FIG. 4) and a connection portion 3 having an inner part taking a shape of a hollow tube are constituted integrally with each other.

Figure 7:
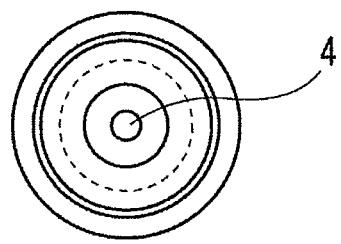
Figure 7:
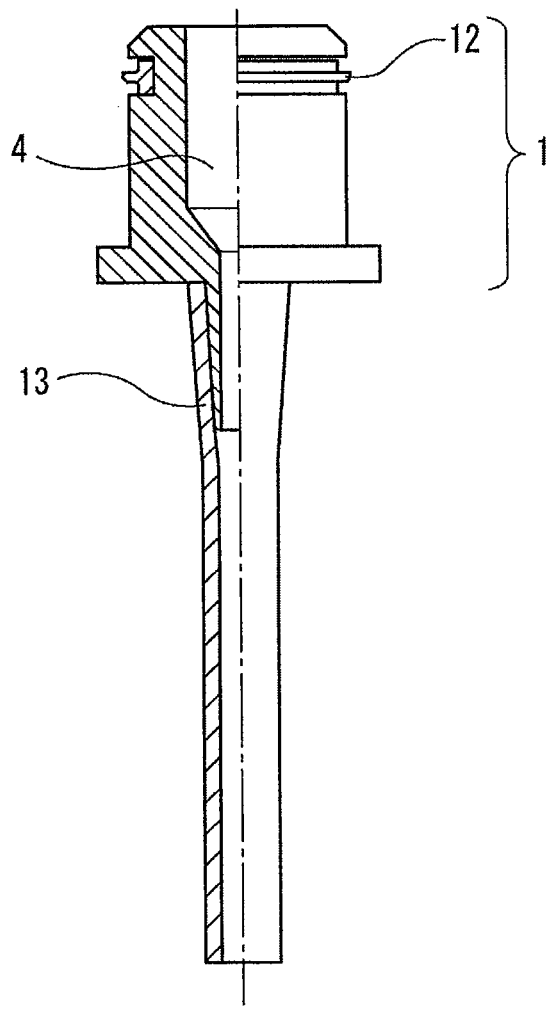

As described above, the conventional connecting member is constituted in combination of the guide portion 1, an O-ring packing 12 and a water tube 13 as shown in FIG. 7(b). Accordingly, man-hour is taken in a production of the conventional connecting member. In the connecting member according to the invention, however, the guide portion 1, the seal portion 2 and the connection portion 3 are constituted integrally with each other. Therefore, it is possible to enhance a productivity and a mass productivity of the connecting member.

According to the invention, the connecting member is formed by the soft material and is guided by the guide portion 1 taking a convex shape having a rounded tip when it is inserted into the opening concave portion 8 of the water tank 6 (see FIG. 4), and a shift of the opening concave portion 8 of the water tank 6 and a central line of the connecting member is decreased. Consequently, the seal portion 2 taking a convex shape for ensuring a seal of the opening concave portion 8 of the water tank 6 and the connecting member can uniformly come in contact so that there is no fear of the leakage of the water.

In addition to the guide portion 1, furthermore, the seal portion 2 taking the convex shape for ensuring the seal of the opening concave portion 8 of the water tank 6 and the connecting member and the connection portion 3 are constituted integrally with each other. Therefore, reliability, that is, durability or prevention of slipping-off can be enhanced and the number of components can also be reduced.

Second Embodiment

Figure 5:
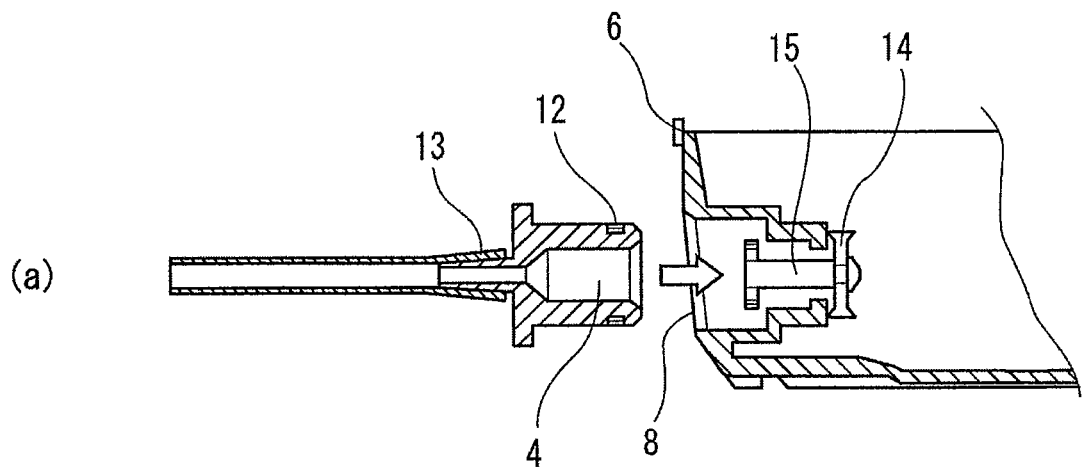
Figure 5:
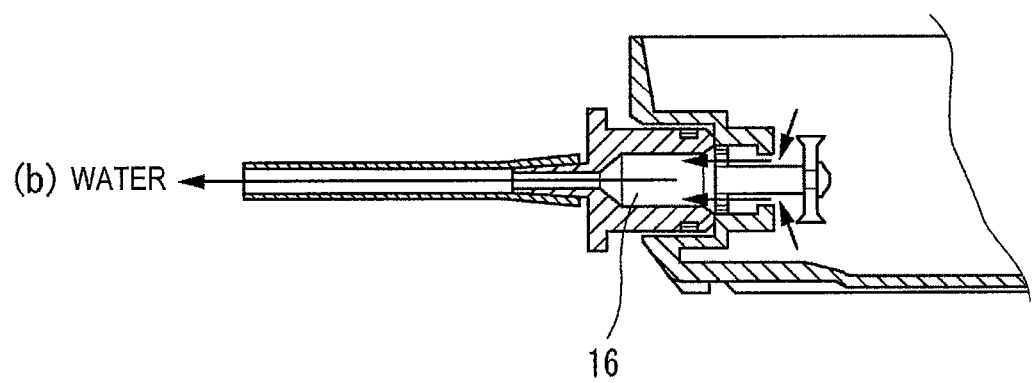
Figure 6:
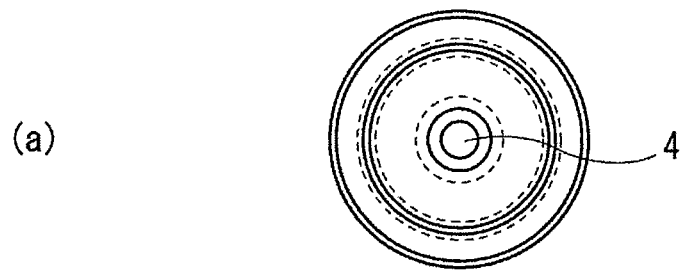
Figure 6:
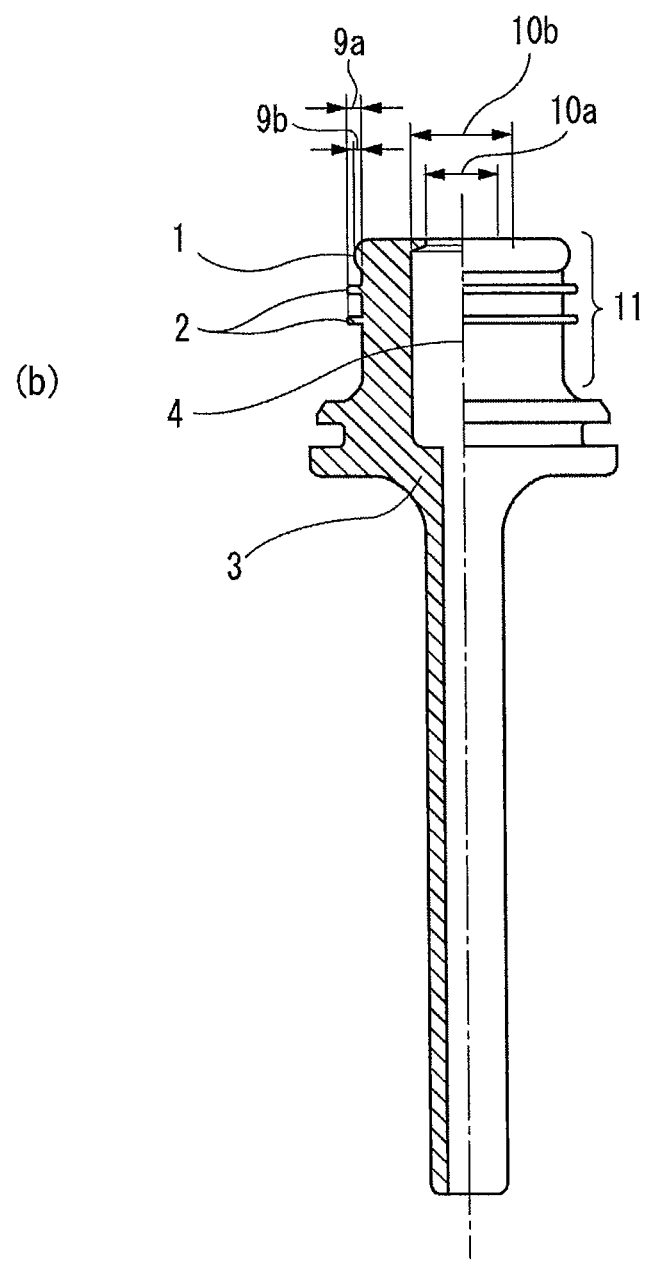

FIG. 6 is an enlarged view showing a main part of a connecting member to be used in a cooker with a steam generating function according to a first or second embodiment of the invention. FIG. 6(a) is a front view showing a connecting member according to the invention. FIG. 6(b) is an exploded sectional view showing the connecting member according to the invention. In FIG. 6(b), a portion to come in contact with an opening concave portion 8 of a water tank 6 (see FIG. 5(a)), that is, a blasting range 11 is subjected to blasting so as to have fine concavo-convex portions on a surface.

According to the invention, a connecting member is formed by a soft material (for example, a silicone rubber, a synthetic rubber or the like). In an insertion into the opening concave portion 8 of the water tank 6 (see FIG. 5(a)), a frictional resistance is increased so that the water tank 6 is removed/inserted with difficulty. However, the blasting range 11 is subjected to the blasting. Therefore, the frictional resistance is relieved by the fine concavo-convex portions on the surface in the blasting range 11 so that an inserting/removing force of the water tank 6 can be reduced.

Third Embodiment

In FIG. 6(b), in an internal hollow portion 4, a hollow inside diameter (an inlet) 10a of a close place to a tip inlet is reduced and a hollow inside diameter (an inner part) 11b of an inner place is increased. When a water tank is removed for a water exchange or the like, therefore, the water collected into the internal hollow portion 4 is reduced in the hollow inside diameter (inlet) 10a. Thus, the internal hollow portion 4 serves to block the water. Consequently, it is possible to prevent the water from dropping onto a floor or the like.

Fourth Embodiment

In FIG. 6(b), a diameter (for example, a radius, a diameter or the like) 9a of a convex part of a guide portion is set to be smaller than a diameter (for example, a radius, a diameter or the like) 9b of a convex part of a seal portion. In a removal/insertion of a water tank, consequently, a convex-shaped seal portion 2 which formed over a round in a circumferential direction of the seal portion 2 always forms a certain clearance in contact with an opening concave portion 8 of a water tank (see FIG. 5(a)). Consequently, the contact of the seal portion 2 taking the convex shape is uniformly made. Thus, it is possible to further enhance reliability and durability of the cooker with a steam generating function according to the invention.

Although the various embodiments have been described above with reference to the drawings, it is apparent that the invention is not restricted to the examples. It is apparent that the skilled in the art can think of various changed or modified examples within the scope of claims and it is a matter of course that they are understood to belong to the technical scope of the invention.

The application is based on Japanese Patent Application No. 2010-001685 filed on Jan. 7, 2010 and contents thereof are incorporated herein by reference.

INDUSTRIAL APPLICABILITY

As described above, in the cooker with a steam generating function according to the invention, a connecting member for removably connecting a water tank to a cooker body is formed by a soft material, and a guide portion, a seal portion and a connection portion are constituted integrally with each other. Consequently, there is no fear of a leakage of water and reliability and durability are excellent.

The invention claimed is:

1. A cooker with a steam generating function, the cooker comprising:
   a heating chamber;
   a removable water tank configured to store water for generating steam, the removable water tank attached toward a front surface of the cooker and further configured to supply heat and the steam into the heating chamber, thereby heat treating an object to be heated, the water tank having a concave opening therein; and
   a connecting member comprising a soft material configured to be removably connected to the water tank,
   the connecting member including a convex-shaped guide portion having a round circumferential end portion for guiding the connecting member into the concave opening in the water tank,
   wherein the guide portion further comprises a convex-shaped seal portion mated to the concave opening of the water tank and surrounding a rounded circumferential surface of the connecting member and sealing the connecting member to the concave opening of the water tank, and
   a coupling portion that includes a hollow tube therein, wherein, in the connecting member, an inside diameter of the hollow tube at the round circumferential end portion in a tip inlet part of the connecting member is less that an inside diameter of the hollow tube in a deep part of the connecting member spaced away from the tip inlet part such that water can collect in the deep part when the water tank is removed and water leakage is reduced, and wherein the guide portion, the seal portion, and the coupling portion comprise a single integrated body of material.

2. The cooker according to claim 1, wherein in the connecting member, a surface of the round circumferential end portion is smooth and includes fine concave and convex portions.

3. The cooker according to claim 1, wherein in the connecting member, an outer diameter of the round circumferential end portion of the convex-shaped guide portion is less than an outer diameter of the seal portion.

* * * * *